United States Patent Office 2,959,586
Patented Nov. 8, 1960

2,959,586
11,18-EPOXY STEROID COMPOUNDS

James F. Kerwin, Broomall, and Manfred E. Wolff, Elkins Park, Pa., assignors to Smith Kline & French Laboratories, Philadelphia, Pa., a corporation of Pennsylvania No Drawing. Filed Sept. 28, 1959, Ser. No. 842,615

17 Claims. (Cl. 260—239.55)

This invention relates to 11,18-epoxy steroid compounds and processes for preparing them. The 11,18-epoxy steroids of this invention more specifically have a pregnane, or allopregnane, skeleton.

These compounds furthermore have anti-aldosterone or diuretic activity in their own right or alternatively are valuable intermediates for preparing compounds having such anti-aldosterone activity by methods which will be described hereafter.

The novel compounds and processes of this invention are illustrated by the following:

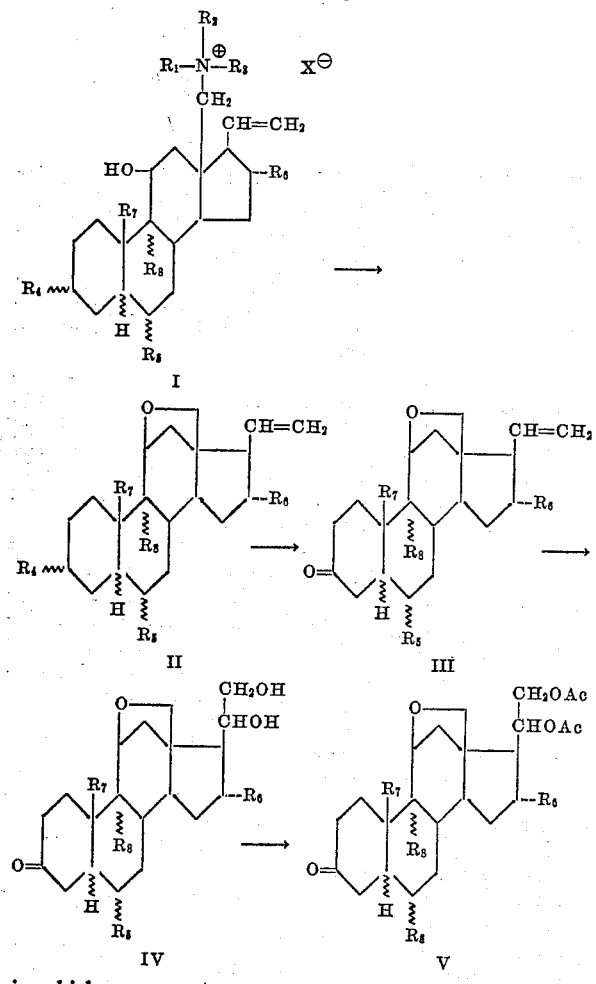

in which:

$R_1$, $R_2$ and $R_3$ are lower alkyl of 1–4 carbon atoms inclusive, preferably methyl;

$R_4$ is hydroxyl, acetoxy (except for Formula II), or, taken together with the carbon atom to which it is attached, keto;

$R_5$ is hydrogen, methyl or fluoro, preferably $\alpha$;
$R_6$ is hydrogen or methyl;
$R_7$ is hydrogen or methyl;
$R_8$ is hydrogen or fluoro, preferably $\alpha$;
$\xi$ is either $\alpha$ or $\beta$;

X represents an anion, preferably an inorganic anion, such as halide, for instance, iodide, chloride or bromide, hydroxide, methosulfate, sulfate or p-toluene-sulfonate, which forms a stable quaternary salt; and Ac represents an acyl group derived from a hydrocarbon carboxylic acid of less than 7 carbon atoms which is nonreactive under the next stages of synthesis. For example for the subsequent ruthenium tetroxide oxidation lower alkanoyl radicals from 2 to 7 carbon atoms preferably acetyl are advantageously present.

Advantageously,
$R_1$, $R_2$ and $R_3$ are methyl;
$R_4$ is hydroxyl;
$R_5$ is hydrogen, $\alpha$-methyl or $\alpha$-fluoro;
$R_6$ is hydrogen or methyl;
$R_7$ is methyl;
$R_8$ is hydrogen or $\alpha$-fluoro;
$\xi$ is either $\alpha$ or $\beta$;
X is a reactive halide of a minimum atomic weight of 35, preferably iodide; and
Ac is acetyl.

The starting material for the preparation of the novel diuretic agents of this invention is the quaternary salt of 18-dimethylamino-20-pregnene such as that represented by Formula I above. These compounds and their preparations are described in our copending application, Serial No. 832,165. Briefly, however, these compounds are prepared by heating at elevated temperatures under a vacuum the quaternary hydroxide derivative of a properly substituted conanine. The decomposition product is the desired 18-dimethylamino-20-pregnene which is then converted to a quaternary salt by reaction of the base with a reactive quaternizing agent such as an alkyl halide or methyl p-toluenesulfonate in a suitable organic solvent in which the reactants are substantially soluble such as benzene, toluene or acetonitrile usually by heating at reflux for several hours. Alternatively the quaternary salt can be prepared by exchanging the anion of, for example, the methiodide over a typical ion exchange resin as described in the patent application noted above.

The desired 11$\beta$-hydroxylated derivatives of the conanines can also be easily prepared by reducing their 3-acetoxy-11-keto congeners with lithium aluminum hydride in an ethereal solvent such as tetrahydrofuran.

The quaternary salt starting material of Formula I essentially containing a $\beta$-hydroxyl substituent in the 11-position and a trialkylammonium cation at the 18-position is reacted with an excess of an alkaline reagent in a polar organic solvent, preferably anhydrous, in which the reactants are substantially soluble as well as with which the reactants are nonreactive and which additionally is a strongly ionizing solvent such as the simple liquid formamides and acetamides as well as their N-lower alkyl derivatives having one or two N-alkyl substituents of from 1 to 4 carbon atoms, acetonitrile or a lower alkyl alcohol such as methanol or ethanol. The preferred solvents are anhydrous N,N-dimethylformamide and N,N-dimethylacetamide.

The alkaline reagent can be any strong base that converts the 11β-hydroxyl group of the steroid into a 11-alkoxide anion. Exemplary are the lower alkali metal alkoxides of up to 6 carbon atoms especially sodium methoxide, sodium ethoxide, sodium tert.-butoxide and their potassium analogues, the alkali metal amides especially sodium amide, lithium amide or potassium amide, the alkali metal hydrides especially lithium hydride or sodium hydride or the alkali metal hydroxides such as sodium or potassium hydroxide. The alkoxides are preferred. Usually an excess of the alkali is used however the proportion of reactants can vary widely.

The reaction is run at temperatures of from about 50–250° C. preferably from about 75–175° C. but of course not exceeding the boiling point of the solvent. The reaction proceeds rapidly often being essentially complete within about 2–3 hours. Usually reaction time is from about 5 to 60 minutes. Temperatures and reaction times outside of these ranges have been found to have little additional advantage.

When the reaction is run as described above the 11β-alkoxide ion displaces the 18-trimethylammonium cation to result in the formation of an 11,18-epoxy moiety which might be said to have a fundamental tetrahydrofuran structure as can be noted in Formula II. This novel displacement reaction is independent of configuration and substituents other than at the 11 and 18 positions, particularly in the A, B rings of the steroid nucleus. Therefore any substituents stable under the alkaline conditions of the reaction can be optionally present. Starting materials have a 3-acyloxy ($R_4$) moiety for instance can be used but usually are hydrolyzed to the 3-hydroxy congener during the rearrangement.

The reaction sequence is then continued in order to oxygenate the 20,21-positions. The 11,18-epoxy-20-pregnen-3-ols of Formula II when $R_4$ is hydroxyl are oxidized preferably using chromic acid in virtually neutral (acetone), acidic (acetic acid) or basic (pyridine) solutions usually at room temperature under standard conditions to give the 3-ketone analogues (III). Note that when $R_4$ is keto this oxidation step is of course unnecessary.

The 3-keto compounds are then oxygenated at the 20,21-positions by suitable oxidation methods. Preferably the oxidation is carried out by reaction at moderate temperatures such as from about 25–50° C. for about 10–48 hours with at least stoichiometric quantities of osmium tetroxide, and preferably an excess, in an anhydrous organic solvent unreactive with the reactants and in which the reactants are substantially soluble such as a preferred ethereal solvent for example diethyl ether, tetrafuran, dioxane etc. Reaction condition other than those outlined have been found to give little further advantage. The resulting osmium esters are decomposed during the work-up of the reaction mixture such as by ethanolic sodium sulfite to give the desired 11,18-epoxy-20-pregnen-29,21-diols (IV). Alternative oxidation reagents are osmium tetroxide plus organic iodoso compounds (Canadian Patent No. 567,479), potassium permanganate in pyridine or osmium tetroxide-potassium perchlorate. Many of these reagents are less desirable because of degradation of other parts of the steroid nucleus due to side oxidation reactions.

The diols are then acylated to protect the sensitive diol moiety usually using an excess of an alkanoyl halide or anhydride of up to 7 carbon atoms, preferably acetic anhydride, with tertiary base usually in liquid tertiary base as pyridine at room temperature or with slight warming such as about 25–100° C. In certain cases a diluent can be used such as ether, ethyl acetate etc. The pyridine solution is quenched in water to give the diacyl products (V).

The diacylated 11,18-epoxy-pregnan-20,21-diols (V) are converted into other useful anti-aldosterone or diuretic products by one of two fundamental synthetic routes.

The first is by conversion into the novel 11,18-epoxy-4-pregnen-3,20-dione-21-ols and their acyl derivatives which have diuretic activity as follows:

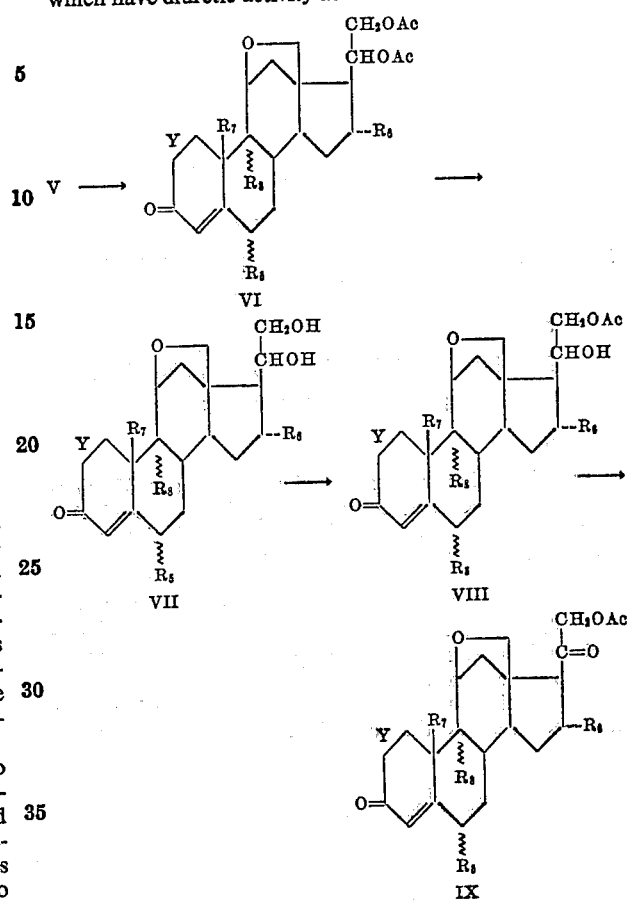

in which $R_5$, $R_6$, $R_7$ and $R_8$ are as described above for Formulas I→V. Ac in Formulas I→IX are acyl protective groups of up to 7 carbon atoms, preferably derived a hydrocarbon carboxylic acid, stable under subsequent reaction conditions such as lower alkanoyl, benzoyl, etc. Y is either an ethylene ($-CH_2-CH_2-$) bond or a vinylene ($-CH=CH-$) bond. When $R_7$ is hydrogen, Y is necessarily ethylene.

The diacylated 11,18-epoxypregnan-20,21-diol-3-ones (V) are reacted with bromine in acetic acid solution at ambient temperatures to form the 2,4-dibromo derivatives in the allopregnane series or 4-bromo in the pregnane series which are debrominated by consecutive reaction with sodium iodide and hydriodic acid or reaction with collidine. These are standard methods of introducing the double bonds into the steroid nucleus and give the diacylated 11,18 - epoxypregnen - 20,21 - diol - 3 - ones (VI). These compounds are deacylated by mild hydrolysis such as with an alkali metal carbonate or bicarbonate in aqueous methanol or ethanol to the diols (VII). The resulting compounds are then mono-acylated at the 21-hydroxy group using about one equivalent of an acylating agent such as an acyl anhydride or chloride in the presence of a tertiary base such as pyridine either in large excess of the base or with smaller amounts of base in a diluting solvent such as ethyl acetate, dioxane, ether etc. The acylation usually is run at moderate temperatures such as about 25° C. for from 4 to 60 hours. The resulting 21-acylates (VIII) are then oxidized at the 20-position, such as using chromic acid in acid solution usually in acetic acid, to give the desired 11,18-epoxypregnen-3,20-dion-21-ol acylates (IX) which are anti-aldosterone or diuretic agents. If desired, the free alcohol compounds are obtained by simple mild hydrolysis of the 21-acylate group such as using an alkali carbonate in aqueous methanol or ethanol.

The Δ¹,² double bond indicated by the symbol Y above is introduced into the moiety either by dehydrohalogenating the 2,4-dibromo intermediate obtained by brominating the diacylated 11,18-epoxy-pregnan-20,21-diol-3-ones (V) using an excess of collidine or by treating these compounds (V) with selenium dioxide in acetic acid-tert. butanol. The remainder of the reactions, VII→IX are as described above. Of course the Δ¹ compounds in the 19-nor series cannot be prepared because of aromatization.

Alternatively, the diacylate of the 11,18-epoxy-pregnan-20,21-diols (V) are converted into aldosterone antagonists having diuretic activity and possessing either a 11,18-lactone moiety of a 11-hydroxy-18-carboxy steroid or the corresponding reduced hemiacetal derivative as follows:

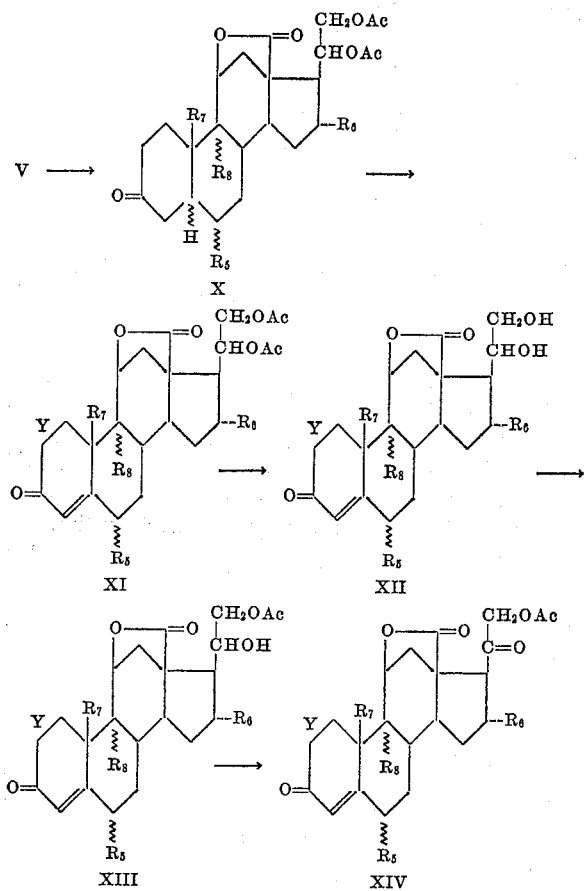

in which Y, R₅, R₆, R₇ and R₈ are as defined above. Ac represents a lower alkanoyl of 2 to 7 carbon atoms for the ruthenium tetroxide oxidation but may be defined more broadly for the following steps as described above for compounds represented by Formulas I to IX.

The diacylated 11,18-epoxypregnan-20,21-diol-3-one derivatives of Formula V are oxidized at the 18-position by a novel process which will be the subject of a copending application. The reaction is run with at least a stoichiometric amount of ruthenium tetroxide and preferably an excess of this reagent. The reaction solvent is any organic solvent in which the reactants are substantially soluble and unreactive. Ruthenium tetroxide is a strong oxidizing agent which reacts with many common solvents such as alcohols, benzene and its derivatives, ethers etc. Especially preferred as solvents for the oxidation are halogenated hydrocarbons of less than 6 carbon atoms which are liquid at the reaction temperature or at ambient temperature such as chloroform, carbon tetrachloride, ethylene dichloride, tetrachloroethylene, etc. Alternatively the liquid lower ester solvents of less than 6 carbon atoms such as ethyl acetate or propionate, the liquid paraffin solvents of less than 13 carbon atoms such as pentane or isooctane or the liquid ketones of less than 6 carbon atoms such as acetone or methyl ethyl ketone can be used.

The reaction is preferably run at about room temperature however temperatures of from about 10° C. to 120° C. can be used. Usually the reaction runs from 12 to 24 hours but a range of from about 1 hour up to 36 hours gives substantial oxidation. As with most organic reactions the length of reaction time varies with the reaction temperature conditions other than those described impart little additional advantage to the reaction. Usually the course of the reaction is followed by the appearance of a γ-lactone band at 5.6μ in the infrared spectrum of the reaction mixture.

As indicated herebefore the ruthenium tetroxide oxidizing agent reacts with many organic moieties such as hydroxyl groups as well as unsaturated or benzenoid systems therefore the 20,21-protective acyl groups must be carefully chosen. The oxidation reaction is a mild reaction which gives high yields of the selectively oxidized product, a 20,21-diacyloxy-11-hydroxy-3-keto-pregnan-18-oic acid, 11,18-lactone derivative of Formula X.

These compounds have diuretic activity in their own right but are further converted to diuretically active compounds related to known compounds by inserting the double bond and 20-keto moieties using the same reaction conditions as described above for the 11,18-epoxy derivatives, V→VII→VIII→IX each step corresponds respectively to XI→XII→XIII→XIV to give the desired 21-acyloxy-3,20-diketo-11-hydroxypregnen-18-oic acid, 11,18-lactone derivative of Formula XIV. These compounds are hydrolyzed to the free 21-hydroxy compounds by mild hydrolysis such as by a dilute acid for example hydrochloric acid in aqueous methanol or ethanol.

The compounds of Formula XIV, in which at least one of R₅, R₆ and R₈ is substituted by a radical other than hydrogen, have exceptional activity and will be covered in a copending application. One compound of Formula XIV has been reported in the prior art as having diuretic activity namely 11,21-dihydroxy-3,20-diketo-4-pregnen-18-oic acid, 11,18-lactone and its 21-acetate derivative, Wettstein et al., Agnew. Chem., 69, 689 (1957).

The novel new compounds of Formula XIV when at least one of R₅, R₆ and R₈ is substituted by a methyl or fluoro moiety as defined hereabove are converted into diuretically useful aldosterone or hemiacetal congeners as follows:

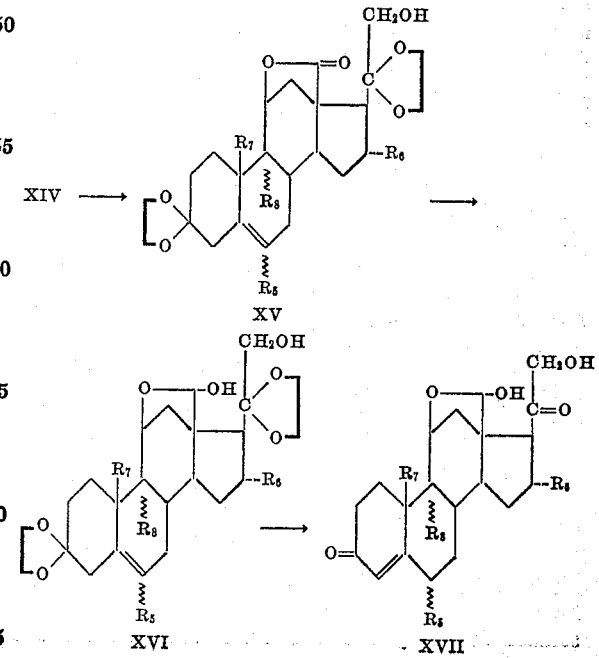

The 11,21-dihydroxy-3,20-diketo-4-pregnen-18-oic acid, 11,18-lactone derivatives of Formula XIV preferably as the free alcohols are reacted an excess of ethylene glycol and p-toluene sulfonic acid with moderate heating such as 50–100° C. and under vacuum to form the bis-ethylenedioxy derivatives at the 3,20-positions (XV). The protected compound is then reduced with lithium aluminum hydride in purified dioxane-ether mixture at about 20–50° C. After decomposition of the aluminum complex, the desired 18-hydroxy analogue (XVI) is obtained. The protective ethylenedioxy moieties are then removed by treatment with dilute acid such as hydrochloric in dioxane to give the desired 11,18-epoxy-4-pregnen-18,21-diol-3,20-dione derivative (XVII) which are the desired diuretic compounds a portion of which will be the subject of a copending application together with the lactone analogues. These compounds as well as others described hereabove also have progestational or corticoid activity depending on whether their basic structure resembles progesterone or the cortical hormones respectively.

In the above description the terms "pregnane" or "pregnene" are used generically to include the corresponding allo or 19-norpregnane structures as well as the normal series. The term "conanine" is used to define steroidal compounds which are pyrrolidine derivatives closed at 18,20-positions having $20\alpha$ or $20\beta$ as well as $5\alpha$ or $5\beta$ configurations as well as N-lower alkyl substituents thereof. The structures of these compounds and their preparations are disclosed in our copending application, Serial No. 832,165. "Lower alkyl" is used to define alkyl moieties having 1 to 4 carbon atoms inclusive, preferably methyl. "Alkali metal" means any member of the metallic group usually included in this classification according to definition but with sodium and potassium preferred. The term "ethereal" when applied to a solvent means any saturated solvent possessing one or more ether linkages having a carbon maximum of 6 carbon atoms.

The definitions described herebefore have been limited for purposes of simplification for instance the acyl group in the definition of $R_4$ in Formula I is described as acetate but a wide range of acyl groups could be substituted therefor. The halogen substituents in $R_5$ and $R_8$ are described as "fluoro" but bromo and chloro atoms could be substituted therefor. Also for instance the substituents at position 6 could be $\beta$ as well as $\alpha$ to the ring. The 6 $\beta$-substituents are isomerized to the $6\alpha$-position by exposure to base or acid. Reduction of the $\Delta^4$-progesterones used as a starting material also gives mixtures of allo and normal pregnanes, mostly allo.

The configuration of the A, B rings as is evident from the above description is immaterial since a $\Delta^4$ unsaturated system is usually formed giving the same product from either a pregnane or allopregnane compound. Actually the $3\beta$-hydroxyallopregnane structure arise from the conanines while $3\alpha$-hydroxypregnanes arise from the $5\beta$-conanines. These two preferred structures are more readily available as starting material.

For the purpose of simplification, the disclosure has been limited to the basic reactions and compounds necessary to practice this invention. Other specific details obvious to one skilled in the art will be even more readily apparent from the following examples. Of course variations and different sequences of reaction will be apparent to one skilled in the art but the overall basic reaction sequences described are only exemplary. All isomers not specifically mentioned but covered in the general structural formulas and names are meant to be included in this invention.

*Example 1*

A solution of 25 g. of $3\beta$-acetoxy-11-ketoconanine in 300 ml. of tetrahydrofuran is added dropwise to a stirred solution of 11.6 g. of lithium aluminum hydride in 300 ml. of refluxing tetrahydrofuran. The mixture is stirred at reflux for one hour. After quenching with 46.4 ml. of water, the separated material is removed by filtration. The filtrate is concentrated to dryness on a rotating evaporator to leave a green oil. After dissolving, the oil in 50 ml. of methanol and water is added, the crystalline solvate, $3\beta,11\beta$-dihydroxy-conanine, is obtained, M.P. 100–104° C.

A mixture of 18.5 g. of the dihydroxyconanine, 25.3 ml. of methyl iodide and 108 ml. of benzene is heated at reflux for two hours. An off-white crystalline precipitate forms. The mixture is diluted with ether and filtered. The filter cake is recrystallized from methanol to give $3\beta,11\beta$-dihydroxyconanine methiodide, M.P. 277–279° C.

A solution of 82 g. of the methiodide in 350 ml. of methanol is passed through a column containing 251 g. of IRA–400 resin (hydroxide form, copending application, Serial No. 832,165). The methanolic eluate is evaporated under reduced pressure. The oily residue is heated to 170° C. and maintained there for 15 minutes. The residue after trituration with methanol is 18-dimethylamino-20-allopregnen-$3\beta,11\beta$-diol.

A solution of 52.9 g. of the 18-dimethylamino-20-allopregnene and 29 ml. of methyl iodide in 3 l. of acetonitrile is heated at reflux for 18 hours. The precipitate is the methiodide, M.P. 260° C.

A solution of 10 g. of 18-dimethylamino-20-allopregnen-$3\beta,11\beta$-diol methiodide in 100 ml. of dimethylformamide is treated with 10 g. of sodium methoxide and gently heated to reflux over an open flame. After 10 minutes, the reaction mixture is heated on a steam cone for 30 minutes, poured into 100 ml. of water, chilled and filtered. Recrystallization of the resulting solid from 70% methanol gives 11,18-epoxy-20-allopregnen-$3\beta$-ol, M.P. 144–145° C. Reaction of the $3\beta$-ol (500 mg.) with an excess of acetic anhydride in pyridine with warming then quenching in water gives the acetate derivative.

The epoxy compound (330 mg.) in 5 ml. of acetone is treated with 0.28 ml. of 4 M chromic acid solution. The mixture is quenched in 50 ml. of water and several ml. of ethanol then chilled to give white crystals of 11,18-epoxy-20-allopregnen-3-one, M.P. 169–171° C.

A mixture of 3.6 g. of the epoxyallopregnenone, 3 g. of osmium tetroxide and 200 ml. of absolute ether is reacted for 48 hours. The black osmium ester is suspended in 300 ml. of 60% aqueous ethanol containing 24 g. of sodium sulfite, refluxed for 4 hours and filtered. The filtrate is evaporated and the residue stirred with methylene chloride. The extract is washed with water, dried and evaporated to give, after recrystallization from ethyl acetate, 11,18-epoxy-allopregnan-20,21-diol-3-one, M.P. 212–215° C.

A solution of 920 mg. of the diol, 2 ml. of acetic anhydride and 2 ml. of pyridine is heated at 90° C. for 30 minutes. The solution is quenched in water, filtered and the resulting solid recrystallized from methanol to give the diacetate, M.P. 155° C.

*Example 2*

A stirred solution of 9 g. of 11,18-epoxy-20,21-diacetoxy-allopregnan-3-one (Example 1) in 120 ml. of acetic acid is treated with 34 ml. of 1.79 M hydrogen bromide in acetic acid and then with 4.95 g. of bromine in 25 ml. of acetic acid. After 10 minutes the solution is poured into 1 l. of water and the solid dibromide separated by filtration. The solid dibromide is added to a suspension prepared by dissolving 4.44 g. of bromine in 42 ml. of acetone, adding 3.4 g. of sodium carbonate, stirring and filtering, then adding 40 g. of sodium iodide followed by a brief reflux period. The resulting mixture is stirred for 2.5 hours, then 7.4 g. of oxalic acid dihydrate is added followed by refluxing for one hour. Ethyl acetate (400 ml.) and water (1 l.) are added. The organic layer is washed with water, 5% sodium bicarbonate and water. It is then stirred with 70 g. of zinc dust and 2 ml. of acetic acid, filtered and washed again. The filtrate is evaporated to give a solid which is taken up in 80 ml. of ethanol and acidified with 6 ml. of acetic acid. After addition of 3 g. of Girard's Reagent "T", the solution is boiled for 30 minutes, cooled to 20° C., treated with 37% formaldehyde and allowed to stand for 25 minutes. It is extracted with ethyl acetate. The water layer is acidified to pH1 and allowed to stand for two hours. It was extracted with ethyl acetate. The second ethyl acetate extract is washed, dried and evaporated to give colorless crystals of 11,18-epoxy-20,21-diacetoxy-4-pregnen-3-one, $$E^{238}_{max} = 16,000$$

I.R. $5.7\mu$, $5.95\mu$ and $6.15\mu$.

A solution of 6.4 g. of the pregnene in 500 ml. of methanol and 200 ml. of water containing 6 g. of potassium bicarbonate and 10 g. of potassium carbonate is allowed to stand at 25° C. for 18 hours. The solution is poured into water to give the free diol which (3 g.) is dissolved in 21 ml. of dioxane with 1.2 g. of dry pyridine and 1.4 g. of acetic anhydride. The mixture is kept at 25° C. for 60 hours then poured into water to separate the crude 21-acetate. This compound (18 mg.) in 1.7 ml. of acetic acid is reacted with 9 mg. of chromic acid in 0.17 ml. of acetic acid and 0.19 ml. of water. After one hour at 25° C., 0.1 ml. of ethanol is added and the reaction mixture quenched. The crystalline product is 11,18-epoxy-21-acetoxy-4-pregnen-3,20-dione.

The acetate (5 mg.) is shaken in 5 ml. of methanol-water containing 10 mg. of sodium carbonate overnight. Quenching the mixture gives the desired 11,18-epoxy-4-pregnen-3,20-dion-21-ol.

Example 3

A solution of 3 g. of 11,18-epoxy-20,21-diacetoxyallopregnan-3-one in 150 ml. of tert.-butanol containing 1.5 ml. of glacial acetic acid is treated with 0.9 g. of selenium dioxide by refluxing for 24 hours under nitrogen. An additional 900 mg. of selenium dioxide is added and the reflux period repeated. The suspension is filtered and the filtrate evaporated. The filtrate residue is dissolved in ethyl acetate. The solution is washed with successive portions of 5% potassium bicarbonate solution, water, ammonium sulfide solution, cold 5% ammonium hydroxide solution, water, 1% hydrochloric acid and water. The residue from the washed extract is recrystallized to give 11,18-epoxy-20,21-diacetoxy-1,4-pregnadien-3-one. A solution of 3.2 g. of the allopregnadiene in 300 ml. of aqueous methanol containing 6 g. of sodium carbonate is held at room temperature overnight. After quenching the desired diol is recovered. This compound (900 mg.) is dissolved in 8 ml. of dioxane along with 4 ml. of pyridine and 0.042 g. of acetic anhydride. After 12 hours, the mixture is quenched to give the monoacetate which (40 mg.) is oxidized in 2 ml. of acetic acid with 20 mg. of chromic acid in acid water solution. After 2 hours, a small amount of ethanol is added and the reaction mixture quenched. The crystalline product is 11,18-epoxy-21-acetoxy-1,4-pregnadien-3,20-dione.

Example 4

A solution of 615 mg. of 11,18-epoxy-20,21-diacetoxyallopregnan-3-one in 15 ml. of carbon tetrachloride is treated with a slight excess of ruthenium tetroxide in carbon tetrachloride by standing at room temperature for 72 hours. The solution is filtered and the filtrate evaporated to give a residue of colorless needles, 20,21-diacetoxy - 11$\beta$ - hydroxy - 3 - ketoallopregnan - 18 - oic acid, 11,18-lactone, M.P. 225–229° C.

This compound (5 g.) is brominated and treated with sodium iodide-hydriodic acid as in Example 2 to give the $\Delta^4$ compound. The 20,21-diacetate groups (64 mg. of compound) are removed in methanolic potassium carbonate bicarbonate to give the diol which (60 mg.) is monoacetylated and (36 mg.) oxidized to give the desired 21 - acetoxy - 11$\beta$ - hydroxy - 3,20 - diketo - 4 - pregnen-18-oic acid, 11,18-lactone, M.P. 193° C. all using procedures as in Example 2.

Example 5

A mixture of 4 g. of lithium aluminum hydride, 8 g. of 3$\beta$-hydroxy-6$\alpha$-fluoro-11-keto-conanine (prepared by reduction of the known 11-keto-6$\alpha$-fluoroprogesterone with palladium-on-charcoal and then sodium borohydride to 6$\alpha$-fluoroallopregnan-3$\beta$-ol-11,20-dione then to the conanine as described in Example 21) and 300 ml. of tetrahydrofuran is prepared and then heated at reflux for two hours. The mixture is then quenched in 30 ml. of water. The metal precipitate is separated then the filtrate is evaporated to leave an oil which is 3$\beta$,11$\beta$-dihydroxy-6$\alpha$-fluoroconanine. This material (3 g.) is reacted with 4.5 g. of methyl bromide in 50 ml. of benzene at reflux for 5 hours. The methobromide separates as a solid and is collected by filtration. The methiodide (2.5 g.) dissolved in methanol (100 ml.) is passed over a column containing IRA–400 resin (hydroxide form). The methanolic eluate is evaporated and the oily residue is heated to 185° C. on an oil bath. After evolution of gas is complete, the desired 18-dimethylamino-6$\alpha$-fluoro-20-allopregnen-3$\beta$, 11$\beta$-diol remains. This compound (2 g.) is quaternized by heating with 20 ml. of ethyl bromide in acetonitrile for 12 hours. The resulting solid is the desired ethobromide starting material.

A mixture of 1 g. of the ethobromide in 15 ml. of dimethylacetamide is treated with 1 g. of potassium tert. butoxide and heated to about 150° C. then on the steam bath for one hour. The product is isolated by quenching in water and recrystallizing the solid from methanol, 11,18-epoxy-6$\alpha$-fluoro-20-allopregnen-3$\beta$-ol. The pregnenol (0.68 g.) in 15 ml. of acetone is oxidized with 0.60 ml. of standardized 4 M chromic acid solution. The mixture is poured into water-ethanol and chilled to give the 3-keto compound.

A mixture of 1.8 g. of 11,18-epoxy-6$\alpha$-fluoro-20-allopregnen-3-one and 2 g. of osmium tetroxide in 200 ml. of absolute dioxane is held at 50° C. for 24 hours. The mixture is filtered. The osmium ether is refluxed in a suspension of 12 g. of sodium sulfite in 150 ml. of aqueous methanol for 6 hours. The filtrate is evaporated to dryness then the residue taken through methylene chloride to give 11,18-epoxy-6$\alpha$-fluoroallopregnan-20,21-diol-3-one. The diol (1 g.) is acylated with 2 ml. of propionic anhydride in pyridine at room temperature overnight. After quenching the dipropionate ester is obtained.

Example 6

A mixture of 4.5 g. of 20,21-dipropionyloxy-11,18-epoxy-6$\alpha$-fluoroallopregnan-3-one in 60 ml. of acetic acid is brominated with 17 ml. of 1.79 M hydrogen bromide and 2.5 g. of bromine in 15 ml. of acetic acid as described in Example 2. After dehydrobromination as described, the desired $\Delta^4$ compound is obtained. A mixture of 3.2 g. of 11,18-epoxy-6$\alpha$-fluoro-4-pregnen-20,21-diol-3-one dipropionate in a solution of 350 ml. of aqueous methanol containing 3 g. of potassium bicarbonate and 5 g. of carbonate is reacted for 12 hours, then quenched to give the diol which (1.5 g.) is monoacetylated with 0.5 g. of acetic anhydride in pyridine. After quenching the crude monoacetate (1.6 g.) is oxidized with 90 mg. of chromic acid in 2 ml. of acetic acid and 2 ml. of water. The quenched reaction mixture yields 11,18-epoxy-6$\alpha$-fluoro-4-pregnen-21-ol-3,20-dione acetate.

Substituting 6$\beta$-fluoro-11-ketoprogesterone for the 6$\alpha$-isomer in Example 5, isolating the 6$\beta$-fluoropregnan-11, 20-dion-3$\alpha$-ol from the reduction reactions and carrying this starting material through the conanine as in Example 21 gives 11,18-epoxy-6$\beta$-fluoropregnan-20,21-diol-3-one. Continuing the reaction through monobromination, dehydrobromination, etc. as in Example 6 gives the 11,18- epoxy-6-fluoro-4-pregnen-21-ol-3,20-dione acetate mixture which is hydrolyzed to the 21-ol and separated by chromatography over alumina to give the 6α and β-fluoro derivatives.

*Example 7*

A mixture of 1 g. of 20,21-dipropionyloxy-11,18-epoxy-6α-fluoroallopregnan-3-one, a slight excess over the stoichiometric amount of ruthenium tetroxide in carbon tetrachloride is heated at reflux for 8 hours. The filtered solution is cooled and evaporated to leave a residue of 20,21 - dipropionyloxy - 6α - fluoro - 11β - hydroxy - 3 - ketoallopregnan-18-oic acid, 11,18-lactone. This lactone (2 g.) is brominated, dehydrobrominated, deacylated, monoacetylated and oxidized as described above to give 21 - acetoxy - 3,20 - diketo - 6α - fluoro - 11β - hydroxy-4-pregnen-18-oic acid, 11,18-lactone. The free alcohol is obtained by gentle hydrolysis of the acetate (400 mg.) in 25 ml. of aqueous methanol containing hydrochloric acid.

*Example 8*

A solution of 15 g. of 18-dimethylamino-6β-methyl-20-pregnen-3α,11β-diol ethiodide (copending application, Serial No. 832,165) in 200 ml. of dimethylformamide is treated with 15 g. of potassium ethoxide and gently refluxed for 15 minutes. After heating at 100° C. for one hour, the reaction mixture is poured into 200 ml. of water, cooled and filtered. The recrystallized solid is 11,18-epoxy-6β-methyl-20-pregnen-3α-ol.

The epoxy compound (3.4 g.) in 50 ml. of glacial acetic acid is treated with 3 ml. of 4 M chromic acid solution. The mixture is quenched in 250 ml. of water and alcohol then cooled to give 11,18-epoxy-6β-methyl-20-pregnen-3-one. A mixture of 3 g. of the ketone, 2.5 g. of osmium tetroxide and 300 ml. of ether is reacted at 25° C. for 24 hours. The osmium ester is separated and decomposed with sodium sulfite in aqueous methanol by refluxing for 3 hours. The methylene chloride extract from the residue extraction gives 11,18-epoxy-6β-methylpregnan-20,21-diol-3-one. This compound (1 g.) is diacetylated by reaction with 2 ml. of acetic anhydride in 3 ml. of pyridine. Quenching in water gives the diacetate.

*Example 9*

20,21-diacetoxy-11,18-epoxy-6β-methylpregnan - 3 - one (3 g.) is dissolved in 35 ml. of dimethylformamide and treated with one molar equivalent of bromine in dimethylformamide dropwise until the bromine color persists. The monobromide obtained after quenching the mixture in water is heated with collidine to give 20,21-diacetoxy-11,18-epoxy-6β-methyl-4-pregnen-3-one. A mixture of 2.1 g. of the ketone is hydrolyzed with sodium carbonate in aqueous ethanol. Quenching gives the diol which (1 g.) is reacted with 0.46 g. of acetic anhydride in 0.5 g. of pyridine and 20 ml. of dioxane. The reaction mixture is quenched after 24 hours to give the monoacetate. This compound (38 mg.) is oxidized with 18 mg. of chromic acid in 5 ml. of acetic acid. Quenching gives the desired α,β-mixture of 21-acetoxy-11,18-epoxy-6-methyl-4-pregnen-3,20-diones. The acetate moiety is hydrolyzed by shaking 50 mg. of the mixture in dilute sodium carbonate solution with methanol to give the 21-ol. The 6α and β-isomers are separated by chromatrographic separation over an alumina column.

*Example 10*

A solution of 1 g. of the 2,4-dibromo derivative of 20,21-diacetoxy-11,18-epoxy-6β - methylpregnan - 3 - one (prepared by brominating as in Example 9 but using two equivalents of bromine) in 15 ml. of collidine is heated at reflux for 30 minutes. Ether is added to the cooled mixture. The filtered ethereal extract is washed with dilute sulfuric acid, water and dried. The residue after evaporation of the solvent is purified by passing over a silicic acid column to give 20,21-diacetoxy-11,18-epoxy-6β-methyl-1,4-pregnadien-3-one. This compound (900 mg.) is hydrolyzed to the diol, monoacetylated and oxidized following the precedures described in Example 8 to give the mixture of isomeric 21-acetoxy-11,18-epoxy-6-methyl-1,4-pregnadien-3,20-diones which are separated by chromatography as in Example 9.

*Example 11*

A mixture of 3 g. of 20,21-diacetoxy-11,18-epoxy-6β-methylpregnan-3-one, with an excess of ruthenium tetroxide in 100 ml. of carbon tetrachloride is allowed to stand for 36 hours. The mixture is filtered and the filtrate evaporated to give crystals of 20,21-diacetoxy-11β-hydroxy-6β-methyl-3-ketopregnan-18-oic acid, 11,18-lactone. The lactone (1 g.) is treated with bromine-dimethylformamide, then collidine to give the Δ⁴ analogue which (750 mg.) is then hydrolyzed to the diol, monoacetylated and oxidized following the procedures of Example 9 to give 21-acetoxy-11β-hydroxy-3,20-diketo-6-methyl-4-pregnen-18-oic acid, 11,18-lactone.

*Example 12*

A mixture of 5 g. of 18-dimethylamino-20-pregnen-3α,11β-diol methiodide (copending application, Serial No. 832,165) and 5 g. of sodium methoxide in 50 ml. of dimethylacetamide is heated to 150° C. for 10 minutes, then poured into an ice slurry to separate 11,18-epoxy-20-pregnen-3α-ol.

This compound (3.3 g.) is oxidized with an acetone solution with 2.8 ml. of 4 M chromic acid solution to give, after quenching, 11,18-epoxy-20-pregnen-3-one. The olefin (1.8 g.), 1.5 g. of osmium tetroxide and 100 ml. of ether is reacted for 24 hours to give, after decomposing the osmium ester, 11,18-epoxypregnan-20,21-diol-3-one. Acetylation of the diol (1.3 g.) with an excess of acetic anhydride in pyridine gives the diacetate. One portion of the diacetate (500 mg.) in carbon tetrachloride is oxidized with an excess of ruthenium tetroxide to give 20,21-diacetoxy-11β-hydroxy-3-ketopregnan-18-oic acid, 11,18-lactone. Another portion (800 mg.) is brominated and dehydrobrominated to form the Δ⁴ compound, then hydrolyzed, monoacetylated and oxidized as in Example 2 to form 11,18-epoxy-21-acetoxy-4-pregnen - 3,20 - dione, identical with that formed in Example 2.

*Example 13*

A mixture of 12.5 g. of 3α-hydroxy-16α-methyl-11-keto-5β-conanine, (our copending application, Serial No. 832,165), 5.8 g. of lithium aluminum hydride in 300 ml. of tetrahydrofuran is heated at reflux for one hour. The 11-hydroxy material is obtained by quenching and evaporating the filtrate. It is then converted to the methiodide, to the hydroxide form, heated and requaternized as in Example 1 to form 18-dimethylamino-16α-methyl-20-pregnen-3α,11β-diol methiodide.

A mixture of 15 g. of this compound, 15 g. of sodium methoxide and 150 ml. of dimethylformamide is reacted as in Example 1 to give 11,18-epoxy-16α-methyl-20-pregnen-3α-ol which (11 g.) is in turn oxidized with chromic acid solution to give the 3-ketone. A mixture of 7.2 g. of this compound, 6 g. of osmium tetroxide and 500 ml. of ether is reacted for 48 hours. The osmium ester is decomposed by refluxing in 500 ml. of aqueous alcohol containing 36 g. of sodium sulfite to give 11,18-epoxy-16α-methylpregnan-20,21-diol-3-one. The diol is acetylated (4.6 g.) with 3 ml. of acetic anhydride in 20 ml. of pyridine to give the 20,21-diacetate.

This compound (3 g.) is brominated to give the 4-bromo derivative which is dehydrobrominated with collidine to give the Δ⁴ analogue which (1.5 g.) is hydrolyzed with alcoholic potassium carbonate to the diol, monoacetylated with one equivalent of acetic anhydride and oxidized with chromic acid in acetic acid as in Example 2 to give 11,18-epoxy-16α-methyl-4-pregnen-3,20-dion-21-ol acetate.

Another portion (1 g.) of the 2,4-dibromo compound prepared by brominating the 4-monobromo compound with one molar equivalent of bromine as described above is reacted with 15 ml. of collidine at reflux for 45 minutes. After treatment with ether and purification of the product by silicic acid chromatography the acetate of 11,18-epoxy-16α-methyl-1,4-pregnadien-20,21-diol-3-one is obtained. This compound is hydrolyzed to the diol with carbonate, monoacetylated and oxidized with chromic acid to give 21-acetoxy-11,18-epoxy-16α-methyl-1,4-pregnadien-3,20-dione.

A mixture of 30 g. of 20,21-diacetoxy-11,18-epoxy-16α-methylpregnan-3-one, 30 g. of ruthenium tetroxide and 150 ml. of carbon tetrachloride is heated at 50° C. for 24 hours. The reaction filtrate is evaporated to give 20,21-diacetoxy-11β-hydroxy-16α-methyl-3-ketopregnan-18-oic acid, 11,18-lactone. This compound (20 g.) is monobrominated, dehydrobrominated, hydrolyzed, monoacetylated and oxidized with chromic acid in acetone as described above to give 21-acetoxy-11β-hydroxy-16α-methyl-3,20-diketo-4-pregnen-18-oic acid, 11,18-lactone.

*Example 14*

A solution of 5 g. of 3β-acetoxy-9(11)-allopregnen-20-one [J. Org. Chem., 16, 1278 (1951)] in 500 ml. of dioxane and 75 ml. of water is treated with N-bromoacetamide and 77 ml. of 1.5% aqueous perchloric acid. After 20 minutes at 27° C., the excess N-bromoacetamide is destroyed with aqueous sodium pyrosulfite. The pH is adjusted to 11. The resulting solution is allowed to stand for 30 minutes, then acidified with glacial acetic acid and evaporated in vacuo. When the dioxane is off the reaction mixture, the residue is diluted with water. The crude product is collected and acetylated with pyridine and acetic anhydride at 100° C. The cooled mixture is poured into water. The solid is collected and recrystallized to give 3β-acetoxy-9β,11β-epoxy-allopregnan-20-one. This compound (5 g.) in 500 ml. of chloroform and 25 ml. of ethanol is mixed with 6 g. of anhydrous hydrogen fluoride. After standing at ambient temperature for 6 hours, the reaction mixture is poured into 5% sodium bicarbonate. The product is extracted into chloroform to give 3β-acetoxy-9α-fluoro-allopregnan-11β-ol-20-one. This compound (3 g.) in 100 ml. of acetic acid is oxidized with 1 g. of chromic acid for 1 hour at 27° C. The solution is quenched and extracted with chloroform to give the 11-one. This compound (2.8 g.) in 75 ml. of ethanol containing 10% w./w. of methylamine is shaken under hydrogen with 200 mg. of platinum oxide until the theoretical amount of hydrogen is absorbed. The mixture is diluted with ethanol, filtered and the filtrate evaporated to leave the 20-methylamino compound. This compound (13 g.) in 200 ml. of chloroform is stirred with 300 ml. of 5% sodium hypochlorite solution for 30 minutes. The chloroform layer is separated, washed and evaporated to leave 3β-acetoxy-9α-fluoro-20α-methyl-chloroamino-allopregnan-11β-one. The chloramine (8.4 g.) is dissolved in 80 ml. of trifluoroacetic acid and irradiated for 45 minutes. The solvent is evaporated and the residue taken up in methanol, made basic and heated at reflux for six hours. The chloroform extracted residue is taken to dryness to give 3β-hydroxy-11-keto-9α-fluoroconanine. This material (6 g.) is reduced with lithium aluminum hydride in tetrahydrofuran as described above to give the 11-ol. The conanine (3 g.) is reacted with 2 ml. of methyl iodide in 300 ml. of benzene at reflux for three hours. The resulting methiodide in methanol is passed over an Amberlite IRA–44 column (hydroxide form, copending application, Serial No. 832,165). The residue from the methanolic eluates is heated at 190° C. at 25 min. until gas formation stops to give 9α-fluoro-18-dimethylamino-20-allopregnen-3β, 11β-diol. This compound (1 g.) is quaternized with methyl iodide in acetonitrile.

The quaternary salt (5 g.) is treated with 5 g. of sodium methoxide in 50 ml. of dimethylformamide as in Example 1 to give 9α-fluoro-11,18-epoxy-20-allopregnen-3β-ol. This compound (3.5 g.) is oxidized with 2.8 ml. of chromic acid solution in acetone. After quenching the 3-ketone is obtained and a mixture of 2 g. of the ketone, 1.5 g. of osmium tetroxide and 150 ml. of ether is reacted for 48 hours. The osmium ester is decomposed by sodium sulfite in methanol to give 11,18-epoxy-9α-fluoroallopregnan-20,21-diol-3-one. This compound is acetylated with an excess of acetic anhydride in pyridine to give the diacetate.

A mixture of 1 g. of the diacetate, an excess of ruthenium dioxide and 75 ml. of carbon tetrachloride is reacted at 40° C. for 48 hours. The filtered solution is evaporated to leave 20,21-diacetoxy-9α-fluoro-11β-hydroxy-3-ketoallopregnan-18-oic acid, 11,18-lactone. This lactone (3 g.) is brominated with 11 ml. of 1.8 M hydrogen bromide and 1.65 g. of bromine in acetic acid, then reacted with sodium iodide-hydriodic acid as in Example 2 to give the Δ⁴ compound. This compound (2.5 g.) is hydrolyzed in methanolic carbonate, mono acetylated with one equivalent of acetic anhydride in pyridine and oxidized with chromic acid in acetone at room temperature as in Example 2 to give 21-acetoxy-9α-fluoro-11β-hydroxy-3,20-diketo-4-pregnen-18-oic acid, 11,18-lactone. The alcohol is prepared by hydrolysis of the acetate in methanolic hydrochloric acid solution.

A solution of 1 g. of the 20,21-diacetate of 9α-fluoro intermediate in 30 ml. of acetic acid is brominated one equivalent of bromine until the bromine color persists. Quenching gives the crude 4-bromo compound which is heated at reflux in collidine to give the Δ⁴ derivative. This compound (1.2 g.) is hydrolyzed by shaking in 100 ml. of methanolic sodium carbonate, monoacetylated with one equivalent of acetic anhydride then oxidized with a slight excess of chromic acid in acetic acid to give 9α-fluoro-11,18-epoxy-21-acetoxy-4-pregnen-3,20-dione. The acetate (50 mg.) is shaken in 25 ml. of aqueous methanol with 100 mg. of sodium carbonate overnight to give the 21-hydroxy compound.

A solution of 1.5 g. of the 20,21 diacetoxy intermediate in 80 ml. of tert.-butanol containing 1 ml. of acetic acid is treated with 0.9 g. of selenium dioxide by refluxing for 36 hours. The reaction filtrate is worked up as in Example 3 to give 9α-fluoro-11,18-epoxy-20,21-diacetoxy-1,4-pregnadien-3-one. This compound (1.6 g.) is hydrolyzed, monoacylated and oxidized as in Example 2 to give 21-acetoxy-11,18-epoxy-9α-fluoro-1,4-pregnadien-3,20-dione. The 21-hydroxy compound is obtained by shaking 500 mg. of this compound in 50 ml. of methanolic carbonate.

*Example 15*

A solution of 10 g. of 3β-hydroxy-20-methylaminoallopregnan-11-one in 100 ml. of acetic acid with 3 g. of chromic oxide in 20 ml. of 90% acetic acid is heated at 65° C. for one hour. The cooled solution is quenched in chilled water to give 20-methylaminoallopregnan-3,11-dione. A solution of 8 g. of the dione in 300 ml. of chloroform is treated with 5% sodium hypochlorite solution as described in Example 14 to give 20-(N-methyl-N-chloroamino)-allopregnan-3,11-dione. A solution of 5 g. of the chloroamine in 75 ml. of trifluoroacetic acid irradiated with ultraviolet light under nitrogen for one hour. The acid is evaporated in vacuo. The residue is taken up in 100 ml. of methanol, made strongly basic with 25% methanolic potassium hydroxide and heated at reflux for one hour. The 3,11-diketoconanine is isolated as in Example 14.

A mixture of 17 g. of 3,11-diketoconanine, 300 ml. of ethylene glycol and 11 g. of p-toluene-sulfonic acid is stirred and distilled over a period of two hours at 1.5 mm. pressure with a still head temperature of about 80° C. The reaction mixture is made alkaline with alcoholic potassium hydroxide and poured into water to separate the 3,3-bisethylenedioxy compound. A suspension of 9 g. of this compound in 500 ml. of purified dioxane is treated dropwise with a solution of 15 g. of lithium aluminum hydride in ether. The mixture is then heated at reflux for 30 minutes and quenched with water. The suspension is filtered and the ethereal filtrate evaporated to give the 11,β-hydroxy compound which (2 g.) in 100 ml. of methanol and 50 ml. of 50% aqueous acetic acid is refluxed for one hour. The suspension is cooled, neutralized and evaporated. The residue is extracted with chloroform to give 3-keto-11β-hydroxyconanine.

This compound (1.8 g.), 2.5 ml. of ethyl iodide in 25 ml. of benzene is heated at reflux for three hours. The solid ethiodide in methanol is then passed over a resin column (as described in copending application, Serial No. 832,165). The oily residue from the methanol eluates is heated to 185° C. for 15 minutes to give a residue of 18-ethylmethylamino-20-allopregnene-11β-ol-3-one. This compound (1.5 g.) is quaternized with butyl iodide in acetonitrile to give the desired quaternary starting material.

The quaternary (1 g.) in 25 ml. of dimethylformamide with 1 g. of lithium hydride is heated over a flame briefly, then on the steam bath for one hour. Quenching in water carefully gives 11,18-epoxy-20-allopregnen-3-one, M.P. 168–169° C.

Example 16

A solution of 20 g. of 19-nor-4-pregnen-3,11β-diol-20-one (U.S. Patent No. 2,878,267) in 250 ml. of methanol with 2 g. of 5% palladium-on-charcoal is hydrogenated at low pressure and room temperature until one mole equivalent of hydrogen is absorbed. The catalyst is removed and the filtrate evaporated to give 19-norallopregnan-3β,11β-diol-20-one [alternatively prepared by the two stage reduction procedure of Example 21 of the known 11β-hydroxy-19-norpregesterone described by Bowers et al., Tetrahedron, 2, 165 (1958)] which is converted to the 3-acetate by treatment with one mole of acetic anhydride in pyridine. This compound (18 g.) is taken up in 250 ml. of ethanol containing 15 g. of butylamine and allowed to stand for five hours. The clear solution is shaken with 1 g. of platinum oxide catalyst at 50 p.s.i. of hydrogen. When one mole equivalent of hydrogen is absorbed, the catalyst and alcohol are removed. The residue is taken through acid-ether treatment. The acid extracts are neutralized and extracted with ether. The ether extracts are washed with salt solution dried and evaporated to yield the acetate of 19-nor-20-butylaminopregnan-3β,11β-diol. A mixture of 15 g. of the secondary amine in acetic acid is reacted slowly with chromic acid in acetic acid solution. The mixture is quenched in water to give the dione. This 11-keto compound (6 g.) in 350 ml. of chloroform is stirred with 350 ml. of 5% sodium hypochlorite solution for two hours. The chloroform layer is removed and worked up to give the N-chloroamine. A solution of 7 g. of the N-chloroamine in 75 ml. of trifluoroacetic acid is irradiated for 60 minutes. The solvent is evaporated to leave the crude 18-chloro compound which is taken up in 100 ml. of methanol and made strongly basic with 25% methanolic potassium hydroxide. After a reflux period of 8 hours, the mixture is evaporated, poured into water and taken through chloroform to give the crude N-butyl-19-nor-3-hydroxy-11-ketoconanine. This compound (2.5 g.) is reduced with an excess of lithium aluminum hydride in tetrahydrofuran as in Example 1 to give the 11β-hydroxyconanine.

A mixture of 5 g. of the conanine and 7 ml. of butyl iodide in benzene is refluxed for 6 hours to give the quaternary salt which is taken up in methanol and passed over a hydroxide resin as described above to give the quaternary hydroxide. The hydroxide is heated at 185° C. under 15 mm. pressure until effervescence stops to form 18-dibutylamino-19-nor-20-allopregnan-3β,11β-diol. This compound (5 g.) is reacted with 5 g. of ethyl bromide in acetonitrile to form the quaternary ethobromide.

The ethobromide (5 g.) in 50 ml. of dimethylformamide with 5 g. of potassium methoxide is heated gently with a flame shortly and then on the steam bath for two hours.

The mixture is quenched to separate 11,18-epoxy-19-nor-20-allopregnen-3β-ol.

The epoxy compound (4 g.) in 100 ml. of acetone is treated with 3.5 ml. of 4 M chromic acid solution. Quenching gives 11,18-epoxy-19-nor-20-allopregnen-3-one. This compound (3.5 g.), 3 g. of osmium tetroxide and 250 ml. of absolute ether is reacted for 36 hours. The ester is refluxed in 350 ml. of sodium sulfite solution for 5 hours. The reaction filtrate is evaporated and the residue extracted into methylene chloride to yield 11,18-epoxy-19-norallopregnan-20,21-diol-3-one. The diol (2 g.) is acetylated with 5 ml. of acetic anhydride in 10 ml. of pyridine to give 11,18-epoxy-20,21-diacetoxy-19-norallopregnan-3-one.

A stirred solution of 0.9 g. of the diacetoxy intermediate is brominated in acetic acid by 3.4 ml. of 1.79 M hydrogen bromide solution and 0.5 g. of bromine to yield the 2,4-dibromide which is dehydrohalogenated with sodium iodide-hydriodic acid to the Δ⁴ compound, 1.2 g. of it is shaken with 100 ml. of alcohol-sodium carbonate solution to the diol, monoacetylated with 1 mole equivalent of anhydride in pyridine and oxidized with chromic oxide in acetic acid as in Example 2 to yield 21-acetoxy-11,18-epoxy-19-nor-4-pregnen-3,20-dione. This compound (50 mg.) is shaken with sodium carbonate solution to give the 21-hydroxy compound.

A solution of 3 g. of the diacetoxy intermediate in 100 ml. of carbon tetrachloride is treated with a slight excess of ruthenium tetroxide at 25° C. for 48 hours. The reaction filtrate is evaporated to give 20,21-diacetoxy-11β-hydroxy-3-keto-19-norallopregnan-18-oic acid, 11,18-lactone.

The lactone is brominated, dehydrobrominated, hydrolyzed, monoacetylated and oxidized with chromic acid in acetic acid as in Example 2 to give 21-acetoxy-11β-hydroxy-3,20-diketo-19-nor-4-pregnan-18-oic acid, 11,18-lactone. Substituting 6α-fluoro-19-nor-allo-pregnan-3β-ol-11,20-dione (prepared as described in U.S. Patent No. 2,838,492) in the amination and cyclization reactions as above to form 6α-fluoro-19-nor-3β-hydroxy-11-ketoconanine and thence in reactions as described the following compounds are prepared; 11,18-epoxy-6α-fluoro-19-nor-20-allopregnen-3-one, 11,18-epoxy-6α-fluoro-19-norallopregnan-3-on-20,21-diol and its diacetate, 11,18-epoxy-19-nor-4-pregnen-21-ol-3,20-dione and its acetate as well as 11β,21-dihydroxy-6α-fluoro-3,20-diketo-19-nor-4-pregnen-18-oic acid, 11,18-lactone and its 21-acetate.

Example 17

A solution of 5 g. of 3β,11β-dihydroxy-19-nor conanine (Example 16) in pyridine-dioxane solution is reacted at room temperature with one molar equivalent of acetic anhydride for 6 hours. Quenching gives the 3-acetate derivative. This compound (4 g.) is reacted with methyl iodide (5 g.) in benzene at reflux to give the methiodide which is dissolved in methanol and passed over hydroxide resin column as described above to give the quaternary hydroxide. The crude quaternary compound is heated to 190° C. at 15 mm. pressure until the effervescence ceases to give the desired 3β-acetoxy-18-dimethylamino-19-nor-20-allopregnen-11β-ol. The methiodide is formed by heating with an excess of methyl iodide in acetonitrile.

A solution of 1 g. of the quaternary in 25 ml. of dimethylacetamide is treated with 1 g. of sodium methoxide as in Example 1 to give 11,18-epoxy-19-nor-20-allopregnen-3β-ol. This compound (100 mg.) is oxidized in 5 ml. of acetone with 0.1 ml. of 4 M chromic acid solution at room temperature. Quenching gives 11,18-epoxy-19- nor-20-allopregnen-3-one identical with that of Example 16.

*Example 18*

A solution of 1.2 g. of 3,20-diketo-6α-fluoro-11β,21-dihydroxy-4-pregnen-18-oic acid, 11,18-lactone (Example 7), 250 ml. of ethylene glycol and 60 mg. of p-toluenesulfonic acid is heated at 80° C. under 0.2 mm. pressure until the volume is reduced to 50 ml. The product is isolated by extraction with chloroform. A solution of 900 mg. of the 3,20-bisethylenedioxy compound in 100 ml. of purified dioxane is treated dropwise with 1.5 g. of lithium aluminum hydride in 150 ml. of ether. The mixture is heated at reflux for 15 minutes and treated with 7 ml. of water. The reaction filtrate is evaporated to give the hemiacetal. A solution of 1 g. of this compound in 20 ml. of dioxane is treated with 2 ml. of concentrated hydrochloric acid and 10 ml. of water. After standing for four hours the mixture is diluted with water to give 11,18-epoxy-6α-fluoro-4-pregnen-18,21,diol-3,20-dione.

*Example 19*

A solution of 11 g. of 21-acetoxy-11β-hydroxy-3,20-diketo-19-nor-4-pregnen-18-oic acid, 11,18-lactone (Example 16) in 4 l. of methanol is treated with 150 ml. of concentrated hydrochloric acid for 24 hours at 25° C. Water (2 l.) is added and the methanol removed in vacuo. The suspension is treated with 2 l. of acetone and allowed to stand for 18 hours at 20° C. The acetone is removed. The remaining aqueous phase is extracted with chloroform to give the 21-ol. This compound (2.3 g.), 350 ml. of ethylene glycol and 120 mg. of p-toluenesulfonic acid is heated at 90° C. under 0.4 mm. pressure as in Example 16 to give the bisethylenedioxy compound. A solution of 1.8 g. of this compound in 250 ml. of dioxane with 3 g. of lithium aluminum hydride in 150 ml. of ether is refluxed for 30 minutes. After quenching, the reduced product is obtained. This compound (2.5 g.) in 50 ml. of dioxane is treated with 4 ml. of hydrochloric acid. Diluting with water gives 11,18-epoxy-19-nor-4-pregnen-18,21-diol-3,20-dione.

*Example 20*

A solution of 3.6 g. of 9α-fluoro-, 11β,21-dihydroxy-3,20-diketo-4-pregnen-18-oic acid, 11,18-lactone is reacted with ethylene glycol in the presence of p-toluenesulfonic acid, reduced with 4 g. of lithium aluminum hydride in dioxane-ether and hydrolyzed with dilute acid to give 11,18-epoxy-9α-fluoro-4-pregnen-18,21-diol-3,20-dione all as described in Example 18.

*Example 21*

A solution of 0.2 mole of 6β,9α-difluoro-4-pregnen-3,11,20-trione (U.S. Patent No. 2,880,205) in 750 ml. of methanol with 2 g. of 5% palladium-on-charcoal is hydrogenated at low pressure and ambient temperature until one molar equivalent of hydrogen is absorbed. The catalyst is removed and solvent evaporated to give 6β,9α-difluoro-allopregnan - 3,11,20-trione. This compound (0.17 mole) in 4.5 l. of methanol is mixed over a period of 10 minutes with a mixture of 1.5 l. of methanol, 50 ml. of 2.5 N sodium hydroxide solution and 1.8 l. of 0.18 molar sodium borohydride in pyridine. The mixture is diluted with an excess of concentrated hydrochloric acid then extracted into ether. The ether extracts are washed, dried and evaporated to leave 6β,9α-difluoroallopregnan-3β-ol-11,20-dione. The dione is acetylated with an excess of acetic anhydride in pyridine at 25° for 6 hours. A suspension of 20 g. of the acetate compound in 450 ml. of ethanol containing about 15 g. of methylamine is hydrogenated with platinum oxide catalyst as in Example 16 to give 6β,9α-difluoro-20-methylaminoallopregnan-3β-ol-11-one acetate. This compound (12 g.) in chloroform is reacted with 500 ml. of 5% sodium hypochlorite solution to give the chloroamine which irradiated in trifluoroacetic acid, then refluxed for 6 hours with 25% methanolic potassium hydroxide to give 6β,9α-difluoro-3β-ol-11-keto conanine. This compound (5 g.) is reduced with lithium aluminum hydride in tetrahydrofuran as in Example 1 to the 11β-hydroxyconanine.

A mixture of 6 g. of the conanine and 7 ml. of methyl iodide in benzene is refluxed for two hours to give the methiodide which is exchanged over a hydroxide anion exchange column as described before to give the quaternary hydroxide. This compound is heated to 170° C. under 10 mm. pressure to give the olefin which is requaternized with methyl iodide in acetonitrile to give 6β,9α-difluoro-18-dimethylamino-20-allopregnan - 3β,11β-diol methiodide.

A mixture of 7 g. of the methiodide in 75 ml. of dimethylformamide with 5 g. of sodium methoxide is heated gently with a flame for 5 minutes, then on the steam bath for 30 minutes. Quenching gives the desired 11,18-epoxy - 6β,9α - difluoro-20-allopregnen-3β-ol. The epoxy compound (5 g.) is oxidized with chromic acid in acetone solution to give the 3-one which (4 g.) is oxidized with 3 g. of osmium tetroxide in 350 ml. of ether at 50° C. The osmium ester is decomposed with 400 ml. of sodium sulfite solution at reflux. After methylene chloride extraction of the residue, the desired 11,18-epoxy-6β,9α-difluoro-20,21-diacetoxyallopregnan - 3 - one is obtained. This diol residue is acetylated with an excess of acetic anhydride in pyridine. The resulting diacetate (1.8 g.) is brominated with hydrogen bromide-bromine to give the dibromo intermediate, then decomposed with sodium iodide hydriodic acid to the Δ⁴ compound. The acetyl groups are removed from this compound by treatment of 1 g. with methanolic sodium carbonate solution. The diol (0.8 g.) is acetylated with one mole equivalent of acetic anhydride in dioxane-pyridine and then oxidized with chromic oxide in acetic acid to give the desired 21-acetoxy-6,9α-difluoro-11,18-epoxy-4-prepnen-3,20-dione mixture which is separated by alumina chromatography.

A solution of 5 g. of the diacetoxyepoxide in 150 ml. of carbon tetrachloride is treated with ruthenium tetroxide at 50° C. for 18 hours. The reaction filtrate is evaporated to give 20,21-diacetoxy-11β-hydroxy-6β,9α-difluoro-3-ketoallopregnan-18-oic acid, 11,18-lactone. The lactone is brominated, dehydrobrominated, hydrolyzed, monoacetylated and oxidized with chromic acid as described above to give 21-acetoxy-6α,9α-fluoro-11β-hydroxy-3,20-diketo-4-pregnen-18-oic acid, 11,18-lactone.

What is claimed is:
1. The method of preparing new 11,18-epoxy steroid compounds having the following fundamental formula:

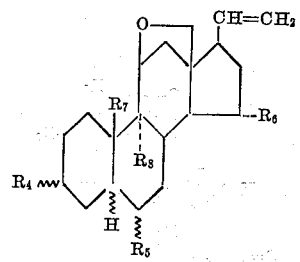

in which $R_4$ is a member selected from the group consisting of hydroxyl and, when taken together with the carbon atom to which it is attached, keto; $R_5$ is a member selected from the group consisting of hydrogen, methyl and fluoro; $R_6$ and $R_7$ are members selected from the group consisting of hydrogen and methyl; $R_8$ is a member selected from the group consisting of hydrogen and fluoro; and ⌇ is a configurational position selected from the group consisting of α and β, which comprises reacting a quaternary salt of a 18-diloweralkylamino-11β-hydroxy steroid having the following fundamental formula:

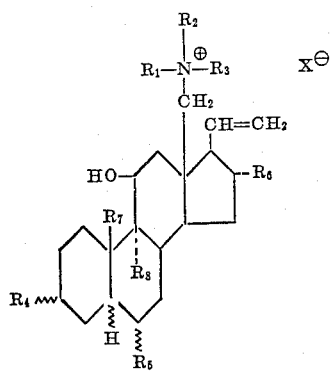

in which $R_1$, $R_2$ and $R_3$ are lower alkyl having 1-4 carbon atoms, $R_4$ is a member selected from the group consisting of acetoxy, hydroxy and, when taken together with the carbon atom to which it is attached, keto; $R_5$, $R_6$, $R_7$, $R_8$ and ⌇ are as previously defined; and $X^\ominus$ is an inorganic anion capable of forming a stable quaternary salt, with an inorganic, strongly basic reagent selected from the group consisting of an alkali metal lower alkoxide, an alkali metal amide, an alkali metal hydride and an alkali metal hydroxide in a polar organic solvent in which the reactants are substantially soluble.

2. The method of claim 1 characterized in that the solvent is anhydrous.

3. The method of claim 2 characterized in that the strongly basic reagent is an alkali metal alkoxide having from 1 to 6 carbon atoms inclusive and the polar organic solvent is a N,N-dimethylamide having 3 to 4 carbon atoms.

4. A chemical compound selected from the group consisting of compounds having the following fundamental structures:

(a)
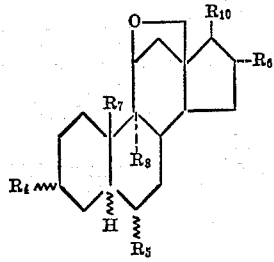

and (b)
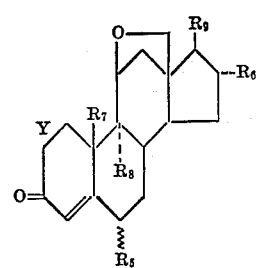

in which Y is a member selected from the group consisting of ethylene and vinylene; $R_4$ is a member selected from the group consisting of hydroxyl, acetoxy and, when taken together with the carbon to which it is attached, keto; $R_5$ is a member selected from the group consisting of hydrogen, methyl and fluoro, $R_6$ is a member selected from the group consisting of hydrogen and methyl, $R_7$ is a member selected from the group consisting of methyl and, when Y is ethylene, hydrogen, $R_8$ is a member selected from the group consisting of hydrogen and fluoro, ⌇ is a configurational position selected from the group consisting of α, and β, $R_9$ is a moiety selected from the group consisting of

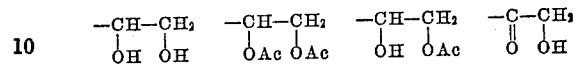

and $$-\underset{\underset{O}{\|}}{C}-\underset{\underset{OAc}{|}}{CH_2}$$

in which Ac is a lower alkanoyl having from 2 to 7 carbon atoms, and $R_{10}$ is a moiety selected from the group consisting $-CH=CH_2$

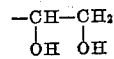

and

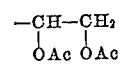

in which Ac is a lower alkanoyl having from 2 to 7 carbon atoms.

5. The method of preparing a chemical compound having the following formula:

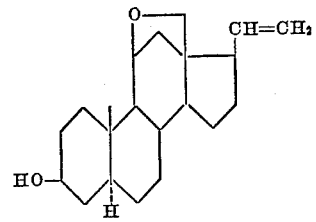

which comprises reacting a quaternary salt having the following formula:

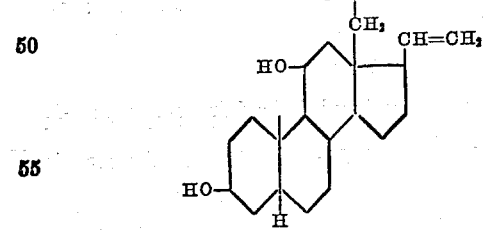

in which $R_1$, $R_2$ and $R_3$ are lower alkyl having 1-4 carbon atoms and $X^\ominus$ is an inorganic anion capable of forming a stable quaternary salt with an alkali metal alkoxide in a N,N-dimethylamide having 3 to 4 carbon atoms at about 75-175° C.

6. The method of preparing a chemical compound having the following formula:

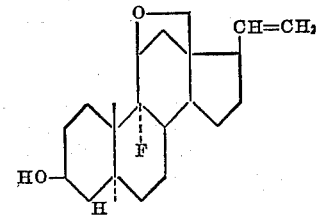

which comprises reacting a quaternary salt having the following formula:

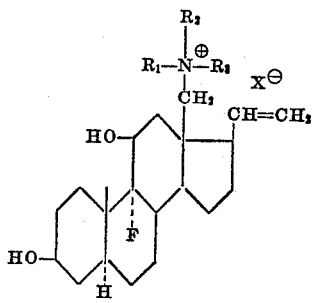

in which $R_1$, $R_2$ and $R_3$ are lower alkyl having 1 to 4 carbon atoms and $X$ is an inorganic anion capable of forming a stable quaternary salt with an alkali metal alkoxide in a N,N-dimethylamide having 3 to 4 carbon atoms at about 75–175° C.

7. A pregnene compound having the following fundamental formula:

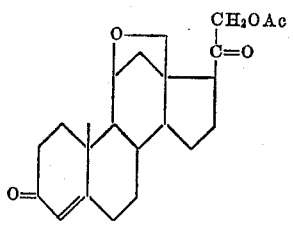

in which Ac is a lower alkanoyl having from 2 to 7 carbon atoms.

8. A pregnadiene compound having the following fundamental formula:

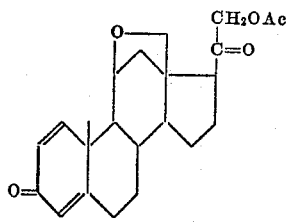

in which Ac is a lower alkanoyl having from 2 to 7 carbon atoms.

9. A pregnane compound having the following fundamental formula:

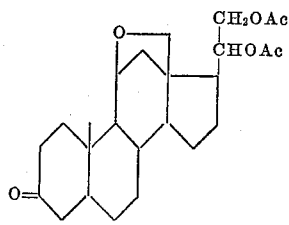

in which Ac is a lower alkanoyl having from 2 to 7 carbon atoms.

10. A pregnene compound having the following fundamental formula:

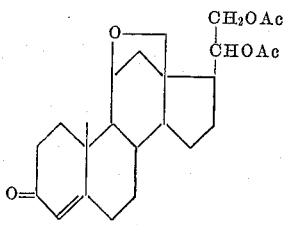

in which Ac is a lower alkanoyl having from 2 to 7 carbon atoms.

11. 11,18-epoxy-20-allopregnen-3β-ol.
12. 11,18-epoxyallopregnan-20,21-diol-3-one.
13. 11,18-epoxy-4-pregnen-3,20-dion-21-ol.
14. 11,18-epoxy-9α-fluoro-4-pregnen-3,20-dion-21-ol.
15. 11,18 - epoxy - 16α - methyl - 4 - pregnen - 3,20-dion-21-ol acetate.
16. 11,18-epoxy-6α-fluoro-4-pregnen-3,20-dion-21-ol.
17. 11,18-epoxy-19-nor-4-pregnen-3,20-dion-21-ol.

References Cited in the file of this patent
UNITED STATES PATENTS
2,493,780    Sarett   ——————————— Jan. 10, 1950